2,834,758

COPOLYMERS OF N-ACRYLAMIDO ALKYL BETAINES

Comer Drake Shacklett, Roselle, N. J., assignor to E. I. du Pont de Nemours and Company, Wilmington, Del., a corporation of Delaware No Drawing. Application March 9, 1954
Serial No. 415,163

11 Claims. (Cl. 260—78)

This invention relates to organic polymers and to their preparation. More particularly, it relates to addition polymers which contain extralinear amide groups and extralinear betaine groups and to their preparation. Still more particularly it relates to copolymers containing such groups which are useful as dispersing agents and protective colloids.

Gelatin has enjoyed wide commercial use in the preparation of photosensitive silver halide emulsions because of its good dispersing properties and because of its excellent protective colloid properties. However, gelatin has the disadvantage that it does not have uniform properties and varies considerably, depending upon its source and the treatments applied to it. It is also susceptible to the deleterious action of molds and bacteria. Various natural and synthetic materials have been proposed as substitutes for gelatin. However, the natural materials have the same disadvantages as gelatin. The synthetic materials, while useful protective colloids, are not always useful as the dispersing agent for the preparation and growth of silver halide crystals of suitable size, shape and potential sensitivity. Thus, previous synthetic colloids which have been proposed do not permit the preparation of photographic emulsions of sensitivity comparable to those of high speed negative and X-ray films prepared with gelatin.

It is an object of this invention to provide a new class of organic copolymers of high molecular weight. Another object is to provide such copolymers which are useful as water-permeable colloids. Yet another object is to provide organic copolymers of high molecular weight that possess the advantageous properties of gelatin, but are free from its disadvantageous properties. A further object is to provide organic copolymers which have good dispersing, peptizing and protective colloid properties and are useful in the preparation of photographic emulsions. A still further object is to provide organic copolymers which can be used to promote the formation and growth of silver halide crystals of such size, shape and potential sensitivity that they can be used in preparing photographic silver halide emulsions of the highest speeds. Still other objects will be apparent from the following description of the invention.

The above objects are attained by the novel copolymers of this invention that are composed of intralinear units of the formulae:

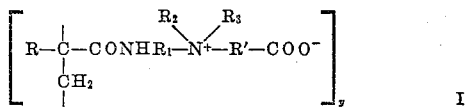    I wherein R is a member taken from the group consisting of hydrogen, alkyl radicals of 1 to 3 carbon atoms, phenyl and cyclohexyl, $R_1$ is a saturated divalent, aliphatic hydrocarbon radical of 2 to 6 carbon atoms, $R_2$ is an alkyl radical of 1 to 3 carbon atoms, $R_3$ is an alkyl radical of 1 to 3 carbon atoms, and R' is a saturated divalent, aliphatic hydrocarbon radical of 1 to 4 carbon atoms, and

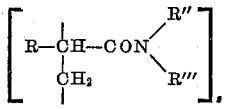    II wherein R, R" and R''' are members taken from the group consisting of hydrogen, alkyl of 1 to 3 carbon atoms, phenyl and cyclohexyl. In the above formulae y and z represent the number of units in the copolymer molecules. These copolymers may contain 1, 2 or more different units of Formula I and 1, 2 or more different units of Formula II, as will be apparent from the following description of the preparation of the copolymers.

The addition copolymers described in the previous paragraph can be prepared by copolymerizing in solution in a suitable solvent, at a temperature above the freezing point of the solvent and below its boiling point, and preferably from 40° C. to 70° C., for a period of 1 to 50 hours or more, (1) one, two or more ethylenically unsaturated amides of the general formula:

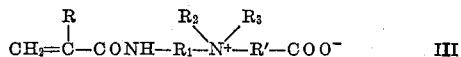    III wherein R is a member taken from the group consisting of hydrogen, alkyl radicals of 1 to 3 carbon atoms, phenyl and cyclohexyl, $R_1$ is a saturated divalent, aliphatic hydrocarbon radical of 2 to 6 carbon atoms, $R_2$ is an alkyl radical of 1 to 3 carbon atoms, $R_3$ is an alkyl radical of 1 to 3 carbon atoms, and R' is a saturated aliphatic hydrocarbon radical of 1 to 4 carbon atoms, and (2) one, two or more ethylenically unsaturated amides of the general formula:

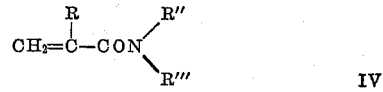    IV where R, R" and R''' are members taken from the group consisting of hydrogen, alkyl of 1 to 3 carbon atoms, phenyl and cyclohexyl. In these two formulae, as well as I and II, the alkyl radicals include methyl, ethyl, propyl and isopropyl.

The reactants (1) and (2) are copolymerized in the proportions of 5 to 80 and preferably 5 to 50 mole percent of the former to 95 to 20 and preferably 95 to 50 mole percent, respectively, of the latter. The polymerization can be carried out in the presence of a suitable solvent or diluent, e. g., water or mixtures of water with water-miscible solvents, e. g., methanol, ethanol, propanol, isopropyl alcohol, and tertiary-butyl alcohol, and may be accelerated by heat, actinic light of wave-lengths between 1800 and 7000 A. U., and/or an addition polymerization initiator, e. g., an organic or inorganic peroxide, an alkali metal or ammonium persulfate, an azonitrile, or an azoamidine hydrochloride. The polymerization preferably is carried out at 40° C. to 70° C., since polymers of especially useful molecular weight can be obtained within these ranges. At higher temperatures lower molecular weight polymers are formed, and at lower temperatures polymers of higher molecular weight are formed.

Various concentrations of monomers may be present in the solvent medium and concentrations from ½ to 2 molar are preferred. It has been found that an increase in monomer concentration results in copolymers of higher molecular weight, while a decrease in polymer concentration results in copolymers of lower molecular weight.

It will be apparent from the above that by varying the concentration of monomers, the ratio of water and water-miscible solvent, temperature and amount of polymerization initiator, there may be obtained copolymers of different molecular weights and viscosities. By a suitable choice of conditions, there may be obtained copolymers of any desired molecular weight.

After the copolymerization reaction is complete, the resulting viscous solution is then treated with a water-miscible, non-solvent for the polymer, e. g., acetone, methyl ethyl ketone, methanol, ethanol, or dioxane, which treatment coagulates or precipitates the polymer in the form of a white solid which may be broken up, reduced or ground to smaller sizes, washed (e. g. with a non-solvent) and dried.

The monomeric reactants (1) constitute the subject matter of copending application Serial No. 389,873, filed November 2, 1953 (U. S. Patent 2,777,872). Those reactants having Formula III, wherein R' is a divalent saturated aliphatic hydrocarbon radical having the configuration —$CHR_6$—$CHR_7$— in which $R_6$ and $R_7$ may be hydrogen, methyl or ethyl, and wherein the other symbols have the values assigned above, can be made, as described in said application by the reaction of (1) a dialkylaminoalkylacrylamide or α-hydrocarbon-substituted-acrylamide having a hydrogen atom attached to the amido nitrogen atom with (2) a β-lactone, preferably in the presence of an inert liquid diluent, which may be a solvent for the latter compounds and a non-solvent for the reaction products at a temperature from —20 to +40° C. and preferably between 0° C. and +20° C., in the substantial absence of water, including water vapor. The precipitated amide (Formula III) is then recovered under moisture-free conditions. Suitable inert diluents include diethyl ether, acetone, methylethyl ketone, tetrahydrofuran and dioxane.

Another suitable specific class of polymerizable amides of the type covered by general Formula III, but wherein R' is a divalent saturated aliphatic hydrocarbon radical having the configuration —$CHR_4$— where $R_4$ is hydrogen, methyl, ethyl, propyl or isopropyl, and the other symbols have the values assigned above, can be made, as described in aforesaid Patent 2,777,872, by reacting (a) a dialkylaminoalkylacrylamide or α-hydrocarbon-substituted-acrylamide having a hydrogen atom attached to the amido nitrogen atom with (b) a lower alkyl ester of an α-halogen-substituted fatty acid, preferably in the presence of an inert liquid diluent of the type described above, at a temperature from —20° C. to +60° C. and preferably 20° C. to 30° C., followed by hydrolysis at a pH about 10. The resulting derivatives of the betaines have the general formula:

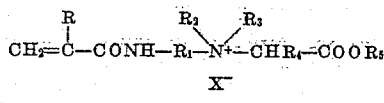

wherein $R_5$ may be alkyl of 1 to 4 carbon atoms, e. g., methyl, ethyl, propyl, isopropyl or n-butyl and X is $Cl^-$, $Br^-$ or $I^-$ and the other symbols have the values assigned previously. The latter compounds may be hydrolyzed to the betaine form before polymerization, or this hydrolysis may be delayed until after polymerization. In the latter case, it is preferable to hydrolyze the polymeric betaine derivatives to convert the extralinear ester groups into betaine groups before precipitation of the polymer with a water-miscible non-solvent therefor. In either case, the hydrolysis may be accomplished by admixing with the solution of the copolymer a sufficient quantity of a base, e. g., sodium hydroxide, potassium hydroxide, barium hydroxide, tetramethylammonium hydroxide, etc., to maintain its pH at 10 to 11 for a period of one-quarter to one hour, generally one-half hour at a moderate temperature, preferably about room temperature (25° C.). After the hydrolysis reaction is complete, a suitable acid, e. g., hydrochloric, sulfuric, acetic, or phosphoric acid, etc., may be added to neutralize the solution before precipitation of the copolymer.

The invention will be further illustrated but is not intended to be limited by the following examples wherein the parts stated are parts by weight, unless otherwise indicated, and the polymerization initiator (referred to as initiator) is α,α-azobis(isobutyramidine hydrochloride).

EXAMPLE I

*Copolymerization of N,2 - methacrylamidoethyl - N,N - dimethyl-β-aminopropionate betaine and methacrylamide.*

In a glass vessel there was placed 1000 parts of water. The temperature was adjusted to 60° C., by means of a water bath, nitrogen gas was passed through the water for a period of about ½ hour to remove dissolved oxygen. Then, 45.6 parts of N,2-methacrylamidoethyl-N,N-dimethyl-β-aminopropionate betaine, 68 parts of methacrylamide and 0.1 part of initiator were added. The introduction of nitrogen was continued and polymerization was allowed to proceed for 24 hours. Excess acetone was added to the copolymer solution to coagulate the copolymer which was pulverized, washed with acetone and dried to yield 106 parts of the white, water-soluble powder, namely, poly(N,2-methacrylamidoethyl-N,N-dimethyl-β-aminopropionate betaine co methacrylamide). The relative viscosity of a 1% aqueous solution of this copolymer at pH 7 and 30° C., was 2.18.

EXAMPLE II

*Copolymerization of N,2 - methacrylamidoethyl - N,N - dimethyl-β-aminopropionate betaine and methacrylamide.*

In a glass vessel there was placed 1000 parts of water. The temperature was adjusted to 70° C., by means of a water bath, and nitrogen gas was passed through the water for a period of about ½ hour. Then, 11.4 parts of N,2-methacrylamidoethyl-N,N-dimethyl-β-aminopropionate betaine, 81.7 parts of methacrylamide and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 90 parts of the white, water-soluble powder, namely, poly (N,2-methacrylamidoethyl-N,N-dimethyl - β - aminopropionate betaine co methacrylamide). The relative viscosity of a 1% aqueous solution of this copolymer at pH 7 and 30° C., was 1.69.

EXAMPLE III

*Copolymerization of N,2 - methacrylamidoethyl - N,N - dimethyl-β-aminopropionate betaine and methacrylamide.*

In a glass vessel there was placed 1000 parts of water. The temperature was adjusted to 40° C., by means of a water bath, and nitrogen gas was passed through the water for a period of about ½ hour. Then, 11.4 parts of N,2-methacrylamidoethyl-N,N-dimethyl-β-aminopropionate betaine, 38.2 parts of methacrylamide and 0.1 part of initiator were added. The introduction of nitrogen was continued and polymerization was allowed to proceed for 72 hours. Excess acetone was added to the copolymer solution to coagulate the copolymer which was pulverized, washed with acetone and dried to yield 45 parts of the white, water-soluble powder, namely, poly- (N,2 - methacrylamidoethyl-N,N-dimethyl-β-aminopropionate betaine co methacrylamide). The relative viscosity of a 1% aqueous solution of this copolymer at pH 7 and 30° C., was 3.73.

EXAMPLE IV

*Copolymerization of N,2 - methacrylamidoethyl - N,N - dimethyl-β-aminopropionate betaine and methacrylamide.*

In a glass vessel there was placed 2000 parts of water. The temperature was adjusted to 40° C., by means of a water bath, and nitrogen gas was passed through the water for a period of about ½ hour. Then, 92.5 parts of N,2-methacrylamidoethyl-N,N-dimethyl-β-aminopropionate betaine, 136.0 parts of methacrylamide and 0.4 part of initiator were added. The introduction of nitrogen was continued and polymerization was allowed to proceed for 24 hours. An additional 0.8 part of the initiator was added and polymerization was allowed to continue for an additional 48 hours. Excess acetone was added to the copolymer solution to coagulate the copolymer which was pulverized, washed with acetone and dried to yield 246 parts of the white, water-soluble powder, namely, poly(N,2-methacrylamidoethyl-N,N-dimethyl-β-aminopropionate betaine co methacrylamide). The relative viscosity of a 1% aqueous solution of this copolymer at pH 7 and 30° C., was 3.96.

This procedure was repeated for three additional runs with the modifications indicated in the following table:

| Amt. of betaine (parts) | Amt. of methacrylamide (parts) | Yield (parts) | Relative viscosity at pH 7 and 30° C. |
|---|---|---|---|
| 185.0 | 104.0 | 260 | 4.92 |
| 277.5 | 68.0 | 352 | 11.9 |
| 370.0 | 34.0 | 320 | 12.8 |

EXAMPLE V

*Copolymerization of N,3 - methacrylamidopropyl - N,N-dimethyl-β-aminopropionate betaine and methacrylamide.*

In a glass vessel there was placed 1000 parts of water. The temperature was adjusted to 40° C., by means of a water bath, and nitrogen gas was passed through the water for a period of about ½ hour. Then, 24.2 parts of N,3-methacrylamidopropyl-N,N-dimethyl-β-aminopropionate betaine, 76.5 parts of methacrylamide and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 90 parts of the white, water-soluble powder, namely, poly(N,3-methacrylamidopropyl - N,N-dimethyl-β-aminopropionate betaine co methacrylamide). The relative viscosity of a 1% aqueous solution of this material at pH 7 and 30° C., was 1.83.

This procedure was repeated with the following changes: 48.4 parts of N,3-methacrylamidopropyl-N,N-dimethyl-β-aminopropionate betaine and 68.0 parts of methacrylamide were allowed to polymerize for a period of 70 hours. The yield of the copolymer was 100 parts whose relative viscosity, determined as in Example I, was 3.64.

This procedure was repeated for three additional runs with the modifications indicated in the following table:

| Amt. of Betaine (parts) | Amt. of Methacrylamide (parts) | Solvent | Temp., ° C. | Yield (parts) | Relative viscosity determined as above |
|---|---|---|---|---|---|
| 96.8 | 136 | 1,500 parts of water plus 393 parts of isopropyl alcohol. | 50 | 162 | 2.70 |
| 96.8 | 136 | 1,500 parts of water plus 395 parts of ethyl alcohol. | 40 | 210 | 2.64 |
| 96.8 | 136 | 1,500 parts of water plus 394 parts of tert-butyl alcohol. | 60 | 180 | 2.97 |

EXAMPLE VI

*Copolymerization of N,2-acrylamidoethyl-N,N-dimethyl-β-aminopropionate betaine and methacrylamide*

In a glass vessel there was placed 1000 parts of water. The temperature was adjusted to 60° C., by means of a water bath, and nitrogen gas was passed through the water for a period of about ½ hour. Then, 21 parts of N,2 - acrylamidoethyl - N,N - dimethyl - β - aminopropionate betaine, 76 parts of methacrylamide, and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 70 parts of the white, water-soluble powder, namely, poly(N,2 - acrylamidoethyl - N,N - dimethyl - β - aminopropionate betain co methacrylamide). The relative viscosity of a 1% aqueous solution of this copolymer at pH 7 and 30° C., was 1.72.

This procedure was repeated with the following changes:

The solvent for the polymerization reaction was composed of 800 parts of water and 158 parts of ethanol. The relative viscosity of a 1% solution of the resulting copolymer (which was obtained in a yield of 69 parts) was 2.31.

EXAMPLE VII

*Copolymerization of N,3 - acrylamidopropyl - N,N - dimethyl-β-aminopropionate betaine and methacrylamide*

In a glass vessel there was placed 500 parts of water. The temperature was adjusted to 60° C., by means of a water bath, and nitrogen gas was passed through the water for a period of about ½ hour. Then, 11.4 parts of N,3 - acrylamidopropyl - N,N - dimethyl - β - aminopropionate betaine, 38.2 parts of methacrylamide and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 35 parts of the white, water-soluble powder, namely, poly(N,3 - acrylamidopropyl - N,N - dimethyl - β - aminopropionate betaine co methacrylamide). The relative viscosity of a 1% aqueous solution of this copolymer at pH 7 and 30° C., was 1.81.

This procedure was repeated with the following changes:

The solvent for the polymerization reaction consisted of 300 parts of water and 158 parts of ethanol. The copolymer yield was 31 parts and the relative viscosity of its 1% solution was 2.01.

EXAMPLE VIII

*Copolymerization of N,2 - methacrylamidoethyl - N,N-dimethylaminoacetate betaine and methacrylamide*

In a glass vessel there was placed 800 parts of water. The temperature was adjusted to 60° C., by means of a water bath, and nitrogen gas was passed through the water for a period of about ½ hour. Then, a solution of 42.8 parts of N,2-methacrylamidoethyl-N,N-dimethylaminoacetate betaine (prepared by hydrolysis of 52.9 parts of carbomethoxymethyl 2-methacrylamidoethyl dimethylammonium chloride in 200 parts of water adjusted to pH 10 to 11 with dilute aqueous NaOH for a period of about ½ hour followed by neutralization with dilute aqueous HCl to pH 7, 68.0 parts of methacrylamide and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 95 parts of the white, water-soluble powder, namely, poly(N,2 - methacrylamidoethyl - N,N - dimethylaminoacetate betaine co methacrylamide). The relative viscosity of a 1% aqueous solution of this material at pH 7 and 30° C., was 1.95.

EXAMPLE IX

*Copolymerization of N,2 - methacrylamidoethyl - N,N-dimethyl-α-aminopropionate betaine and methacrylamide*

In a glass vessel there was placed 800 parts of water. The temperature was adjusted to 60° C., by means of a water bath, and nitrogen gas was passed through the water for a period of about ½ hour to remove dissolved oxygen. Then, a solution of 22.8 parts of N,2-methacrylamidoethyl-N,N-dimethyl-α-aminopropionate betaine (prepared by hydrolysis of 33.7 parts of 1-carboethoxyethyl 2-methacrylamidoethyl dimethylammonium bromide in 200 parts of water at pH 10 to 11 for a period of about ½ hour followed by neutralization to pH 7, as described in Example VIII, 76.5 parts of methacrylamide and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 71 parts of the white, water-soluble powder, namely, poly(N,2-methacrylamidoethyl-N,N-dimethyl-α-aminopropionate betaine co methacrylamide). The relative viscosity of a 1% aqueous solution of this copolymer at pH 7 and 30° C., was 1.89.

The procedure was repeated with the change that the solution of 22.8 parts of N,2-methacrylamidoethyl-N,N-dimethyl-α-aminopropionate betaine was prepared by the hydrolysis of 37.0 parts of 1-carbomethoxyethyl 2-methacrylamidoethyl dimethylammonium iodide. The yield of the product was 56 parts and the relative viscosity of a 1% solution thereof was 1.93.

EXAMPLE X

*Copolymerization of N,3-methacrylamidopropyl-N,N-dimethylaminoacetate betaine and methacrylamide*

In a glass vessel there was placed 800 parts of water. The temperature was adjusted to 60° C., by means of a water bath, and nitrogen gas was passed through the water for a period of about ½ hour. Then, 22.8 parts of N,3-methacrylamidopropyl-N,N-dimethylaminoacetate betaine (prepared by hydrolysis of 29.3 parts of carboethoxymethyl 3 - methacrylamidopropyl dimethylammonium chloride in 200 parts of water at pH 10 to 11 for a period of about ½ hour, followed by neutralization to pH 7, as described in Example VIII, 76.5 parts of methacrylamide, and 0.1 part of initiator were added. The introduction of nitrogen was continued and polymerization was allowed to proceed for 20 hours. Excess acetone was added to the copolymer solution to coagulate the colopymer which was pulverized, washed with acetone and dried to yield 65 parts of the white, water-soluble powder, namely, poly(N,3 - methacrylamidopropyl-N,N-dimethylaminoacetate betaine co methacrylamide). The relative viscosity of a 1% aqueous solution of this material at pH 7 and 30° C., was 1.56.

This procedure was repeated with the change that the 22.8 parts of N,3-methacrylamidopropyl-N,N-dimethylaminoacetate betaine were prepared by the hydrolysis of 33.7 parts of carboethoxymethyl 3-methacrylamidopropyl dimethylammonium bromide. The yield of the product was 65 parts, the relative viscosity of 1% aqueous solutions of which, at pH 7 and 30° C., was 2.35.

EXAMPLE XI

*Copolymerizations of N,3-methacrylamidopropyl-N,N-dimethyl-α-aminopropionate betaine and methacrylamide*

In a glass vessel there was placed 400 parts of water. The temperature was adjusted to 60° C., by means of a water bath, and nitrogen gas was passed through the water for a period of about ½ hour. Then, a solution of 12.1 parts of N,3-methacrylamidopropyl-N,N-dimethyl-α-aminopropionate betaine (prepared by hydrolysis of 17.6 parts of 1-carboethoxyethyl 3-methacrylamidopropyl dimethylammonium bromide in 100 parts of water adjusted to pH 10 to 11 by addition of dilute aqueous NaOH, for a period of about ½ hour, followed by neutralization with dilute aqueous HCl to pH 7, 38.2 parts of methacrylamide, and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 58 parts of the white, water-soluble powder, namely, poly(N,3-methacrylamidopropyl-N,N-dimethyl-α-aminopropionate betaine co methacrylamide). The relative viscosity of a 1% aqueous solution of this material at pH 7 and 30° C., was 1.45.

This procedure was repeated with the following changes: 800 parts of water, a solution of 24.2 parts of N,3-methacrylamidopropyl-N,N-dimethyl-α-aminopropionate betaine in 200 parts of water (made by hydrolyzing 35.1 parts of 1-carboethoxyethyl 3-methacrylamidopropyl dimethylammonium bromide adjusted to pH 1 to 2 with dilute aqueous HCl while dissolved in 200 parts of water followed by neutralization of the solution to pH 7 with dilute aqueous NaOH) and 76.5 parts of methacrylamide were used, and a yield of 67 parts of the resulting copolymer were obtained. The relative viscosity of a 1% aqueous solution of this copolymer at pH 7 and 30° C., was 1.91.

EXAMPLE XII

*Copolymerization of N,2-methacrylamidoethyl-N,N-diethylaminoacetate betaine and methacrylamide*

In a glass vessel there was placed 400 parts of water. The temperature was adjusted to 60° C., by means of a water bath, and nitrogen gas was passed through the water for a period of about ½ hour. Then, a solution of 12.2 parts of N,2-methacrylamidoethyl-N,N-diethylaminoacetate betaine (prepared by hydrolysis of 17.6 parts of carboethoxymethyl 3 - methacrylamidopropyl diethylammonium bromide in 100 parts of water at pH 10 to 11, for a period of about ½ hour, followed by neutralization to pH 7, as described in Example VIII), 38.2 parts of methacrylamide, and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 62 parts of the white, water-soluble powder, namely poly(N,2-methacrylamidoethyl-N,N-diethylaminoacetate betaine co methacrylamide). The relative viscosity of a 1% aqueous solution of this copolymer at pH 7 and 30° C., was 1.48.

This procedure was repeated with the following changes: 800 parts of water, a solution of 24.4 parts of N,2 - methacrylamidoethyl - N,N - diethylaminoacetate betaine in 200 parts of water (prepared by hydrolysis of 38.4 parts of carbomethoxymethyl-2-methacrylamidoethyl diethylammonium iodide) and 76.5 parts of methacrylamide were used. The yield of the copolymer was 60 parts, the relative viscosity of a 1% aqueous solution of which was 2.10.

EXAMPLE XIII

*Copolymerization of N,3-methacrylamidopropyl-N,N-diethylaminoacetate betaine and methylacrylamide*

In a glass vessel there was placed 800 parts of water. The temperature was adjusted to 60° C., by means of a water bath, and nitrogen gas was passed through the water for a period of about ½ hour. Then, a solution of 25.6 parts of N,3-methacrylamidopropyl-N,N-diethylaminoacetate betaine (prepared by hydrolysis of 36.5 parts of carboethoxymethyl 3-methacrylamidopropyl diethylammonium bromide in 200 parts of water, at pH 10 to 11 for a period of about ½ hour, followed by neutralization to pH 7, as described in Example VIII), 76.5 parts of methacrylamide, and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 62 parts of the white, water-soluble powder, namely, poly(N,3-methacrylamidopropyl-N,N-diethylaminoacetate betaine co methacrylamide). The relative viscosity of a 1% aqueous solution of this copolymer at pH 7 and 30° C., was 1.79.

EXAMPLE XIV

*Copolymerization of N,2-acrylamidoethyl-N,N-dimethylaminoacetate betaine and methacrylamide*

In a glass vessel there was placed 800 parts of water. The temperature was adjusted to 60° C., by means of a water bath, and nitrogen gas was passed through the water for a period of about ½ hour. Then, a solution of 20.0 parts of N,2-acrylamidoethyl-N,N-dimethylaminoacetate betaine (prepared by hydrolysis, as described in Example XI, of 25.0 parts of carbomethoxymethyl 2-acrylamidoethyl dimethylammonium chloride in 200 parts of water at pH 10 to 11, for a period of about ½ hour, followed by neutralization to pH 7, as described in Example VIII), 76.5 parts of methacrylamide and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 62 parts of the white, water-soluble powder, namely, poly(N,2 - acrylamidoethyl - N,N-dimethylaminoacetate betaine co methacrylamide). The relative viscosity of a 1% aqueous solution of this copolymer at pH 7 and 30° C., was 1.94.

The procedure was repeated with the following changes: The solution of 20.0 parts N,2-acrylamidoethyl-N,N-dimethylaminoacetate betaine was prepared from 35.6 parts of carboethoxymethyl 2-acrylamidoethyl dimethylammonium iodide. The yield of the product was 58 parts, and the relative viscosity of its 1% aqueous solution is 3.90.

EXAMPLE XV

*Copolymerization of N,3 - acrylamidopropyl - N,N-dimethylaminoacetate betaine and methacrylamide*

In a glass vessel there was placed 800 parts of water. The temperature was adjusted to 60° C., by means of a water bath, and nitrogen gas was passed through the water for a period of about ½ hour. Then, a solution of 21.4 parts of N,3-acrylamidopropyl-N,N-dimethylaminoacetate betaine (prepared by hydrolysis, as described in Example XI, of 32.3 parts of carboethoxymethyl-3-acrylamidopropyl dimethylammonium bromide in 200 parts of water at pH 10 to 11 for a period of about ½ hour followed by neutralization to pH 7), 76.5 parts of methacrylamide and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 60 parts of the white, water-soluble powder, namely, poly(N,3 - acrylamidopropyl-N,N-dimethylaminoacetate betaine co methacrylamide). The relative viscosity of a 1% aqueous solution of this copolymer at pH 7 and 30° C., was 1.64.

EXAMPLE XVI

*Copolymerization of N,3 - acrylamidopropyl - N,N-dimethyl-α-aminopropionate betaine and methacrylamide*

In a glass vessel there was placed 800 parts of water. The temperature was adjusted to 60° C., by means of a water bath, and nitrogen gas was passed through the water for a period of about ½ hour. Then, a solution of 22.6 parts of N,2-acrylamidoethyl-N,N-dimethyl-α-aminopropionate betaine (prepared by hydrolysis of 33.7 parts of 1-carboethoxyethyl 3-acrylamidopropyl dimethylammonium bromide in 200 parts of water at pH 10 to 11 for a period of about ½ hour followed by neutralization to pH 7, as described in Example VIII), 76.5 parts of methacrylamide, and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 70 parts of the white, water-soluble powder, namely, poly(N,3-acrylamidopropyl - N,N - dimethyl - α - aminopropionate betaine co methacrylamide). The relative viscosity of a 1% aqueous solution of this material at pH 7 and 30° C., was 1.84.

The procedure was repeated with the exceptions that the solution of 22.6 parts of N,3-acrylamidopropyl-N,N-dimethyl-α-aminopropionate betaine was made from 37.0 parts of 1-carbomethoxyethyl 3-acrylamidopropyl dimethylammonium iodide, and the yield of the product was 57 parts. The relative viscosity of 1% aqueous solution of this copolymer at pH 7 and 30° C., was 1.82.

EXAMPLE XVII

*Copolymerization of N,2-acrylamidoethyl-N,N-diethylaminoacetate betaine and methacrylamide*

In a glass vessel there was placed 800 parts of water. The temperature was adjusted to 60° C., by means of a water bath, and nitrogen gas was passed through the water for a period of about ½ hour. Then, a solution of 22.8 parts of N,2-acrylamidoethyl-N,N-diethylaminoacetate betaine, (prepared by hydrolysis, as described in Example XI, of 38.4 parts of carboethoxymethyl 2-acrylamidoethyl diethylammonium iodide in 200 parts of water at pH 10 to 11 for a period of about ½ hour followed by neutralization to pH 7, as described in Example VIII), 76.5 parts of methacrylamide, and 0.1 part of initiator were added. The introduction of nitrogen was continued and polymerization was allowed to proceed for 20 hours. Excess acetone was added to the copolymer solution to coagulate the copolymer. This copolymer was then pulverized, washed with acetone and dried to yield 60 parts of the white, water-soluble powder, namely, poly(N,2-acrylamidoethyl-N,N-diethylaminoacetate betaine co methacrylamide). The relative viscosity of a 1% aqueous solution of this copolymer at pH 7 and 30° C., was 2.03.

EXAMPLE XVIII

*Copolymerization of N,3-acrylamidopropyl-N,N-diethylaminoacetate betaine and methacrylamide*

In a glass vessel there was placed 800 parts of water. The temperature was adjusted to 60° C., by means of a water bath, and nitrogen gas was passed through the water for a period of about ½ hour. Then, a solution of 24.2 parts of N,3-acrylamidopropyl-N,N-diethylaminoacetate betaine (prepared by hydrolysis, as described in Example XI, of 35.1 parts of carboethoxymethyl 3-acrylamidopropyl diethylammonium bromide in 200 parts of water at pH 10 to 11 for a period of about ½ hour followed by neutralization to pH 7, as described in Example VIII), 76.5 parts of methacrylamide, and 0.1 part of initiator were added. The introduction of nitrogen was continued and polymerization was allowed to proceed for 20 hours. Excess acetone was added to the copolymer solution to coagulate the copolymer. This copolymer was then pulverized, washed with acetone and dried to yield 60 parts of the white, water-soluble powder, namely, poly(N,3-acrylamidopropyl-N,N-diethylaminoacetate betaine co methacrylamide). The relative viscosity of a 1% aqueous solution of this copolymer at pH 7 and 30° C., was 1.87.

The procedure was repeated with the changes that the solution of 24.2 parts of N,3-acrylamidopropyl-N,N-diethylaminoacetate betaine was prepared from 39.8 parts of carboethoxymethyl - 3 - acrylamidopropyl diethylammonium iodide, and that the yield of the product was 50 parts. The relative viscosity of 1% aqueous solutions of this copolymer at 30° C., and pH 7 equal 1.86.

EXAMPLE XIX

*Copolymerization of carboethoxymethyl - 2 - methacrylamidoethyl dimethylammonium bromide and methacrylamide*

In a glass vessel there was placed 800 parts of water and 158 parts of ethanol. The temperature was adjusted to 60° C., by means of a water bath, and nitrogen gas was passed through the solution for a period of about ½ hour. Then, 32.3 parts of carboethoxymethyl-2-methacrylamidoethyl dimethylammonium bromide, 76.5 parts of methacrylamide, and 0.1 part of $\alpha,\alpha'$-azobis(isobutyramidine hydrochloride) were added. The introduction of nitrogen was continued and polymerization was allowed to proceed for 20 hours. The copolymer solution was then adjusted to pH 10 to 11 with dilute aqueous sodium hydroxide for a period of about ½ hour, and then neutralized to pH 7 with dilute aqueous hydrochloric acid. Excess acetone was added to the copolymer solution to coagulate the copolymer. This copolymer was then pulverized, washed with acetone and dried to yield 80 parts of the white, water-soluble powder, namely, poly-(N,2-methacrylamidoethyl - N,N - dimethylaminoacetate betaine co methacrylamide). The relative viscosity of a 1% aqueous solution of this material at pH 7 and 30° C., was 1.54.

EXAMPLE XX

*Copolymerization of carboethoxymethyl - 2 - methacrylamidoethyl dimethylammonium iodide and methacrylamide*

In a glass vessel there was placed 800 parts of water and 158 parts of ethanol. The temperature was adjusted to 60° C., by means of a water bath, and nitrogen gas was passed through the solution for a period of about ½ hour. Then, 37.0 parts of carboethoxymethyl-2-methacrylamidoethyl dimethylammonium iodide, 76.5 parts of methacrylamide, and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer. This copolymer was then pulverized, washed with acetone and dried to yield 75 parts of the white, water-soluble powder, namely, poly(N,2-methacrylamidoethyl-N,N-dimethylaminoacetate betaine co methacrylamide). The relative viscosity of a 1% aqueous solution of this copolymer at pH 7 and 30° C., was 1.59.

EXAMPLE XXI

*Copolymerization of 1-carboethoxyethyl 2-methacrylamidoethyl dimethylammonium bromide and methacrylamide*

In a glass vessel there was placed 500 parts of water. The temperature was adjusted to 60° C., by means of a water bath, and nitrogen gas was passed through the water for a period of about ½ hour. Then, 16.8 parts of 1-carboethoxyethyl 2-methacrylamidoethyl dimethylammonium bromide, 38.2 parts of methacrylamide, and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution, which treatment caused coagulation of the copolymer. This copolymer was then pulverized, washed with acetone and dried to yield 50 parts of the white, water-soluble powder, namely, poly(N,2-methacrylamidoethyl-N,N-dimethyl-$\alpha$-aminopropionate betaine co methacrylamide). The relative viscosity of a 1% aqueous solution of this material at pH 7 and 30° C., was 1.47.

EXAMPLE XXII

*Copolymerization of 1-carbomethoxyethyl 2-methacrylamidoethyl dimethylammonium iodide and methacrylamide*

In a glass vessel there was placed 1000 parts of water. The temperature was adjusted to 60° C., by means of a water bath, and nitrogen gas was passed through the water for a period of about ½ hour. Then, 74.0 parts of 1-carbomethoxyethyl 2-methacrylamidoethyl dimethylammonium iodide, 68.0 parts of methacrylamide, and 0.1 part of initiator were added. The introduction of nitrogen was continued and polymerization was allowed to proceed for 20 hours. The copolymer solution was then adjusted to pH 10 to 11 for a period of about one-half hour and then neutralized to pH 7, as described in Example XIX. Excess acetone was added to the copolymer solution to coagulate the copolymer. This copolymer was then pulverized, washed with acetone and dried to yield 92 parts of the white, water-soluble powder, namely, poly(N,2-methacrylamidoethyl-N,N-dimethyl - $\alpha$ - aminopropionate betaine co methacrylamide). The relative viscosity of a 1% aqueous solution of this copolymer at pH and 30° C., was 2.26.

The procedure was repeated with the following changes: 800 parts of water and 158 parts of ethanol were used as solvent for 37.0 parts of 1-carbomethoxyethyl 2-methacrylamidoethyl dimethylammonium iodide and 76.5 parts of methacrylamide. The yield of the copolymer was 75 parts and the relative viscosity of its 1% aqueous solution was 1.73.

EXAMPLE XXIII

*Copolymerization of carboethoxymethyl 3-methacrylamidopropyl dimethylammonium iodide and methacrylamide*

In a glass vessel there were placed 800 parts of water and 158 parts of ethanol. The temperature was adjusted to 60° C., by means of a water bath, and nitrogen gas was passed through the solution for a period of about ½ hour. Then, 38.4 parts of carboethoxymethyl 3-methacrylamidopropyl dimethylammonium iodide, 76.5 parts of methacrylamide and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer. This copolymer was then pulverized, washed with acetone and dried to yield 70 parts of the white, water-soluble powder, namely, poly(N,3-methacrylamidopropyl-N,N-dimethylaminoacetate betaine co methacrylamide). The relative viscosity of a 1% aqueous solution of this copolymer at pH 7 and 30° C., was 1.59.

EXAMPLE XXIV

*Copolymerization of 1-carbomethoxyethyl 3-methacrylamidopropyl dimethylammonium iodide and methacrylamide*

In a glass vessel there was placed 1000 parts of water. The temperature was adjusted to 60° C., by means of a water bath, and nitrogen gas was passed through the water for a period of about ½ hour. Then, 38.4 parts of 1-carbomethoxyethyl 3-methacrylamidopropyl dimethylammonium iodide, 76.5 parts of methacrylamide and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer. This copolymer was then pulverized, washed with acetone and dried to yield 72 parts of the white, water-soluble powder, namely, poly(N,3-methacrylamidopropyl-N,N-dimethyl-α-aminopropionate betaine co methacrylamide). The relative viscosity of a 1% aqueous solution of this copolymer at pH 7 and 30° C., was 1.82.

The above procedure was repeated with 800 parts of water and 158 parts of ethanol as polymerization solvent. The yield of the copolymer was 75 parts, and the relative viscosity of its 1% aqueous solution at pH 7 and 30° C., was 1.64.

EXAMPLE XXV

*Copolymerization of carbomethoxymethyl 2-methacrylamidoethyl diethylammonium iodide and methacrylamide*

In a glass vessel there was placed 500 parts of water. The temperature was adjusted to 60° C., by means of a water bath, and nitrogen gas was passed through the solution for a period of about ½ hour. Then, 19.2 parts of carbomethoxymethyl 2-methacrylamidoethyl diethylammonium iodide, 38.2 parts of methacrylamide and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer. This copolymer was then pulverized, washed with acetone and dried to yield 60 parts of the white, water-soluble powder, namely, poly(N,2-methacrylamidoethyl - N,N-diethylaminoacetate betaine co methacrylamide). The relative viscosity of a 1% aqueous solution of this copolymer at pH 7 and 30° C., was 1.56.

EXAMPLE XXVI

*Copolymerization of carboethoxymethyl 2-methacrylamidoethyl diethylammonium iodide and methacrylamide*

In a glass vessel there was placed 800 parts of water and 158 parts of ethanol. The temperature was adjusted to 60° C., by means of a water bath, and nitrogen gas was passed through the solution for a period of about ½ hour. Then, 39.8 parts of carboethoxymethyl 2-methacrylamidoethyl diethylammonium iodide, 76.5 parts of methacrylamide, and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer. This copolymer was then pulverized, washed with acetone and dried to yield 70 parts of the white, water-soluble powder, namely, poly(N,2-methacrylamidoethyl-N,N-diethylaminoacetate betaine co methacrylamide). The relative viscosity of a 1% aqueous solution of this copolymer at pH 7 and 30° C., was 1.55.

EXAMPLE XXVII

*Copolymerization of carboethoxymethyl 3-methacrylamidopropyl diethylammonium iodide and methacrylamide*

In a glass vessel there was placed 800 parts of water and 158 parts of ethanol. The temperature was adjusted to 60° C., by means of a water bath, and nitrogen gas was passed through the solution for a period of about ½ hour. Then, 41.2 parts of carboethoxymethyl 3-methacrylamidopropyl diethylammonium iodide, 76.5 parts of methacrylamide and 0.1 part of initiator were added. The introduction of nitrogen was continued and polymerization was allowed to proceed for 20 hours. The copolymer solution was adjusted to pH 10 to 11 for a period of about ½ hour and then neutralized to pH 7, as described in Example XIX. Excess acetone was added to the copolymer solution to coagulate the copolymer. This copolymer was then pulverized, washed with acetone and dried to yield 75 parts of the white, water-soluble powder, namely, poly(N,3-methacrylamidopropyl-N,N-diethylaminoacetate betaine co methacrylamide). The relative viscosity of a 1% aqueous solution of this copolymer at pH 7 and 30° C., was 1.59.

EXAMPLE XXVIII

*Copolymerization of carbomethoxymethyl 2-acrylamidoethyl dimethylammonium chloride and methacrylamide*

In a glass vessel there was placed 100 parts of water. The temperature was adjusted to 60° C., by means of a water bath, and nitrogen gas was passed through the water for a period of about ½ hour. Then, 2.5 parts of carbomethoxymethyl 2-acrylamidoethyl dimethylammonium chloride, 7.65 parts of methacrylamide and 0.01 part of initiator were added. The introduction of nitrogen was continued and polymerization was allowed to proceed for 20 hours. The copolymer solution was then adjusted to pH 10 to 11 for a period of about one-half hour and then neutralized to pH 7, as described in Example XIX. Excess acetone was added to the copolymer solution to coagulate the copolymer. This copolymer was then pulverized, washed with acetone and dried to yield 8 parts of the white, water-soluble powder, namely, poly(N,2-acrylamidoethyl-N,N-dimethylaminoacetate betaine co methacrylamide). The relative viscosity of a 1% aqueous solution of this copolymer at pH 7 and 30° C., was 1.57.

EXAMPLE XXIX

*Copolymerization of carboethoxymethyl 2-acrylamidoethyl dimethylammonium bromide and methacrylamide*

In a glass vessel there was placed 800 parts of water and 158 parts of ethanol. The temperature was adjusted to 60° C., by means of a water bath, and nitrogen gas was passed through the solution for a period of about ½ hour. Then, 30.9 parts of carboethoxymethyl 2-acrylamidoethyl dimethylammonium bromide, 76.5 parts of methacrylamide and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer. This copolymer was then pulverized, washed with acetone and dried to yield 77 parts of the white, water-soluble powder, namely, poly(N,2 - acrylamidoethyl - N,N-dimethylaminoacetate betaine co methacrylamide). The relative viscosity of a 1% aqueous solution of this copolymer at pH 7 and 30° C., was 1.50.

EXAMPLE XXX

*Copolymerization of carboethoxymethyl 2-acrylamidoethyl dimethylammonium iodide and methacrylamide*

In a glass vessel there was placed 800 parts of water and 158 parts of ethanol. The temperature was adjusted to 60° C., by means of a water bath, and nitrogen was passed through the solution for a period of about ½ hour. Then, 35.6 parts of carboethoxymethyl 2-acrylamidoethyl dimethylammonium iodide, 76.5 parts of methacrylamide and 0.1 part of initiator were added. The introduction of nitrogen was continued and polymerization was allowed to proceed for 20 hours. The copolymer solution was then adjusted to pH 10 to 11 for a period of about ½ hour and then neutralized to ph 7, as described in Example XIX. Excess acetone was added to the copolymer solution to coagulate the copolymer which was pulverized, washed with acetone and dried to yield 71 parts of the white, water-soluble powder, namely, poly-(N,2-acrylamidoethyl-N,N-dimethylaminoacetate betaine co methacrylamide). The relative viscosity of a 1% aqueous solution of this copolymer at pH 7 and 30° C., was 1.75.

EXAMPLE XXXI

*Copolymerization of 1-carbomethoxyethyl 2-acrylamidoethy dimethylammonium iodide and methacrylamide*

In a glass vessel there was placed 800 parts of water and 158 parts of ethanol. The temperature was adjusted to 60° C., by means of a water bath, and nitrogen gas was passed through the solution for a period of about ½ hour. Then, 35.6 parts of 1-carbomethoxyethyl-2-acrylamidoethyl dimethylammonium iodide, 76.5 parts of methacrylamide, and 0.1 part of initiator were added. The introduction of nitrogen was continued and polymerization was allowed to proceed for 20 hours. The copolymer solution was then adjusted to pH 10 to 11 with dilute aqueous NaOH for a period of about ½ hour and then neutralized to pH 7, as described in Example XIX. Excess acetone was added to the copolymer solution to coagulate the copolymer which was pulverised, washed with acetone and dried to yield 70 parts of the white, water-soluble powder, namely, poly(N,2-acrylamidoethyl-N,N-dimethyl-α-aminopropionate betaine co methacrylamide). The relative viscosity of a 1% aqueous solution of this copolymer at pH 7 and 30° C., was 1.81.

EXAMPLE XXXII

*Copolymerization of carboethoxymethyl 3-acrylamidopropyl dimethylammonium bromide and methacrylamide*

In a glass vessel there was placed 100 parts of water. The temperature was adjusted to 60° C., by means of a water bath, and nitrogen gas was passed through the water for a period of about ½ hour. Then, 3.23 parts of carboethoxymethyl 3-acrylamidopropyl dimethylammonium bromide, 7.65 parts of methacrylamide, and 0.01 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer. This copolymer was then pulverized, washed with acetone and dried to yield 8.5 parts of the white, water-soluble powder, namely, poly(N,3-acrylamidopropyl - N,N - dimethylaminoacetate betaine co methacrylamide). The relative viscosity of a 1% aqueous solution of this copolymer at pH 7 and 30° C., was 1.56.

EXAMPLE XXXIII

*Copolymerization of 1-carboethoxyethyl 3-acrylamidopropyl dimethylammonium bromide and methacrylamide*

In a glass vessel there was placed 800 parts of water and 158 parts of ethanol. The temperature was adjusted to 60° C., by means of a water bath, and nitrogen gas was passed through the solution for a period of about ½ hour. Then, 33.7 parts of 1-carboethoxyethyl 3-acrylamidopropyl dimethylammonium bromide, 76.5 parts of methacrylamide, and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer, which was then pulverized, washed with acetone and dried to yield 79 parts of the white, water-soluble powder, namely, poly(N,3 - acrylamidopropyl - N,N-dimethyl-α-aminopropionate betaine co methacrylamide). The relative viscosity of a 1% aqueous solution of this copolymer at pH 7 and 30° C., was 1.70.

EXAMPLE XXXIV

*Copolymerization of 1-carbomethoxyethyl 3-acrylamidopropyl dimethylammonium iodide and methacrylamide*

In a glass vessel there was placed 800 parts of water and 158 parts of ethanol. The temperature was adjusted to 60° C., by means of a water bath, and nitrogen gas was passed through the solution for a period of about ½ hour. Then, 37.0 parts of 1-carbomethoxyethyl 3-acrylamidopropyl dimethylammonium iodide, 76.5 parts of methacrylamide, and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer which was pulverized, washed with acetone and dried to yield 70 parts of the white, water-soluble powder, namely, poly(N,3-acrylamidopropyl-N,N-dimethyl - α - aminopropionate betaine co methacrylamide). The relative viscosity of a 1% aqueous solution of this copolymer at pH 7 and 30° C., was 2.56.

EXAMPLE XXXV

*Copolymerization of carbomethoxymethyl 2-acrylamidoethyl diethylammonium bromide and methacrylamide*

In a glass vessel there was placed 100 parts of water. The temperature was adjusted to 60° C. by means of a water bath, and nitrogen gas was passed through the solution for a period of about ½ hour. Then, 3.2 parts of carbomethoxymethyl 2-acrylamidoethyl diethylammonium bromide, 7.65 parts of methacrylamide, and 0.01 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer which was pulverized, washed with acetone and dried to yield 9 parts of the white, water-soluble powder, namely, poly(N,2-acrylamidoethyl-N,N-diethylamino acetate betaine co methacrylamide). The relative viscosity of a 1% aqueous solution of this copolymer at pH 7 and 30° C., was 1.58.

EXAMPLE XXXVI

*Copolymerization of carboethoxymethyl 3-acrylamidopropyl diethylammonium bromide and methacrylamide*

In a glass vessel there was placed 800 parts of water and 158 parts of ethanol. The temperature was adjusted to 60° C., by means of a water bath, and nitrogen was passed through the solution for a period of about ½ hour. Then, 35.1 parts of carboethoxymethyl 3-acrylamidopropyl diethylammonium bromide, 76.5 parts of methacrylamide, and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer which was then pulverized, washed with acetone and dried to yield 87 parts of the white, water-soluble powder, namely, poly(N,3 - acrylamidopropyl - N,N - diethylaminoacetate betaine co methacrylamide). The relative viscosity of a 1% aqueous solution of this copolymer at pH 7 and 30° C., was 1.74.

EXAMPLE XXXVII

*Copolymerization of carboethoxymethyl 3-acrylamidopropyl diethylammonium iodide and methacrylamide*

In a glass vessel there was placed 600 parts of water and 316 parts of ethanol. The temperature was adjusted to 60° C., by means of a water bath, and nitrogen gas was passed through the solution for a period of about ½ hour. Then, 38.4 parts of carboethoxymethyl 3-acrylamidopropyl diethylammonium iodide, 76.5 parts of methacrylamide, and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer which was pulverized, washed with acetone and dried to yield 60 parts of the white, water-soluble powder, namely, poly(N,3 - acrylamidopropyl - N,N - diethylaminoacetate betaine co methacrylamide). The relative viscosity of a 1% aqueous solution of this copolymer at pH 7 and 30° C., was 1.79.

EXAMPLE XXXVIII

*Copolymerization of carboethoxymethyl 2-acrylamidoethyl diethylammonium iodide and methacrylamide*

In a glass vessel there was placed 800 parts of water and 158 parts of ethanol. The temperature was adjusted to 60° C., by means of a water bath, and nitrogen gas was passed through the solution for a period of about ½ hour. Then, 38.4 parts of carboethoxymethyl 2-acrylamidoethyl diethylammonium iodide, 76.5 parts of methacrylamide, and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer which was pulverized, washed with acetone and dried to yield 82 parts of the white, water-soluble powder, namely, poly(N,2-acrylamidoethyl-N,N-diethylaminoacetate betaine co methacrylamide). The relative viscosity of a 1% aqueous solution of this copolymer at pH 7 and 30° C., was 2.03.

EXAMPLE XXXIX

*Copolymerization of N,2-methacrylamidoethyl-N,N-dimethyl - β - aminopropionate betaine, methacrylamide and N-isopropyl-methacrylamide*

In a glass vessel there was placed 1000 parts of water. The temperature was adjusted to 60° C., by means of a water bath, and nitrogen gas was passed through the water for a period of about ½ hour. Then, 22.8 parts of N,2-methacrylamidoethyl-N,N - dimethyl - β - aminopropionate betaine, 68.0 parts of methacrylamide, 12.7 parts of N-isopropylmethacrylamide, and 0.1 part of initiator were added. The introduction of nitrogen was continued and polymerization was allowed to proceed for 20 hours. Excess acetone was added to the copolymer solution to coagulate the copolymer which was pulverized, washed with acetone and dried to yield 69 parts of the three-component, white, water-soluble powder, namely, poly-(N,2-methacrylamidoethyl-N,N-dimethyl - β - aminopropionate betaine co methacrylamide co N-isopropylmethacrylamide). The relative viscosity of a 1% aqueous solution of this copolymer at pH 7 and 30° C., was 2.74.

EXAMPLE XL

*Copolymerization of carboethoxymethyl 3 - methacrylamidopropyl dimethylammonium bromide, N,N-dimethylacrylamide and methacrylamide*

In a glass vessel there was placed 1000 parts of water. The temperature was adjusted to 60° C., by means of a water bath, and nitrogen gas was passed through the solution for a period of about ½ hour. Then, 67.4 parts of carboethoxymethyl 3-methacrylamidopropyl dimethylammonium bromide, 59.5 parts of methacrylamide, 9.9 parts of N,N-dimethylacrylamide, and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer which was pulverized, washed with acetone and dried to yield 119 parts of the white, water - soluble powder, namely, poly(N,3 - methacrylamidopropyl-N,N-dimethylaminoacetate betaine co methacrylamide co N,N-dimethylacrylamide). The relative viscosity of a 1% aqueous solution of this copolymer at pH 7 and 30° C., was 2.23.

EXAMPLE XLI

*Copolymerization of carboethoxymethyl 3-methacrylamidopropyl diethylammonium bromide, acrylamide and methyacrylamide*

In a glass vessel there was placed 1000 parts of water. The temperature was adjusted to 60° C., by means of a water bath, and nitrogen gas was passed through the solution for a period of about ½ hour. Then, 73.0 parts of carboethoxymethyl 3-methacrylamidopropyl diethylammonium bromide, 7.1 parts of acrylamide, 59.5 parts of methacrylamide, and 0.1 part of initiator were added. The introduction of nitrogen was continued and polymerization was allowed to proceed for 20 hours. The copolymer solution was then adjusted to pH 10 to 11 for a period of about ½ hour and then neutralized to pH 7, as described in Example XIX. Excess acetone was added to the copolymer solution to coagulate the copolymer which was pulverized, washed with acetone and dried to yield 117 parts of the white, water-soluble powder, namely, poly(N,3-methacrylamidopropyl - N,N - diethylaminoacetate betaine co acrylamide co methacrylamide). The relative viscosity of a 1% aqueous solution of this copolymer at pH 7 and 30° C., was 1.90.

EXAMPLE XLII

*Copolymerization of N,3 - methacrylamidopropyl-N,N-dimethyl-β-aminopropionate betaine and acrylamide*

In a glass vessel there was placed 500 parts of water. The temperature was adjusted to 50° C., by means of a water bath, and nitrogen gas was passed through the solution for a period of about ½ hour. Then, 24.2 parts of N,3-methacrylamidopropyl - N,N - dimethyl-β-aminopropionate betaine, 28.4 parts of acrylamide, and 0.1 part of initiator were added. The introduction of nitrogen was continued and polymerization was allowed to proceed for 20 hours. The copolymer solution was diluted with 500 parts of water and excess acetone was added to the copolymer solution to coagulate the copolymer which was then pulverized, washed with acetone and dried to yield 60 parts of the white, water-soluble powder, namely, poly(N,3 - methacrylamidopropyl-N,N-dimethyl-β-aminopropionate betaine co acrylamide). The relative viscosity of a 1% aqueous solution of this copolymer at pH 7 and 30° C., was 1.59.

EXAMPLE XLIII

*Copolymerization of N,3 - methacrylamidopropyl-N,N-dimethyl-β-aminopropionate betaine and N,N-dimethylacrylamide*

In a glass vessel there were placed 500 parts of water. The temperature was adjusted to 60° C., by means of a water bath, and nitrogen gas was passed through the water for a period of about ½ hour. Then, 24.2 parts of N,3-methacrylamidopropyl - N,N - dimethyl-β-aminopropionate betaine, 39.6 parts of N,N-dimethylacrylamide, and 0.1 part of initiator were added. The introduction of nitrogen was continued and polymerization was allowed to proceed for 20 hours. The copolymer solution was diluted with 500 parts of water and excess acetone was added to the copolymer solution to coagulate the copolymer which was then broken into small particles, washed with acetone, and dried to yield 55 parts of the white, water-soluble powder, namely, poly(N,3-methcrylamidopropyl - N,N - dimethyl-β-aminopropionate betaine co N,N-dimethylacrylamide). The relative viscosity of a 1% aqueous solution of this copolymer at pH 7 and 30° C., was 5.27.

In place of the specific ethylenically unsaturated amides of formulae IV used in the foregoing examples, there may be substituted one or more other amides having such a formula. Among such additional useful amides are N-isopropylmethacrylamide, N-phenylacrylamide, N-isopropylacrylamide, N-phenylmethacrylamide, N,N-diethylacrylamide, N-methyl-N-ethylacrylamide, etc.

Similarly, in place of the specific ethylenically unsaturated compounds of Formula III, there may be substituted one or more other of such compounds. The ratio of the two reactants of Formulae III and IV should, of course, be selected so as to come within the 5 to 80 mol percent range of the former, as stated above. Suitable additional compounds are disclosed in application Ser. No. 389,873, filed November 2, 1953, and include N,3-methacrylamidopropyl-N,N-dimethyl-β-amino-propionate betaine, N,2-methacrylamidoethyl-N,N-dimethyl - β - amino-propionate betaine, N,3-acrylamidopropyl - N,N - dimethyl-β-amino-propionate betaine, N,2-acrylamidoethyl-N,N-dimethyl-β-amino-propionate betaine, N,2-methacrylamidoethyl-N,N-dimethylaminoacetate betaine, N,2-methacrylamidoethyl-N,N-dimethyl-α-aminopropionate betaine, N,2-methacryl-amidoethyl-N,N-diethylaminoacetate betaine, N,3-methacrylamidopropyl - N,N - dimethylaminoacetate betaine, N,3-methacrylamidopropyl-N,N-dimethyl - α - amino-propionate betaine, N,3-methacrylamidopropyl-N,N-diethylaminoacetate betaine, N,2-acrylamidoethyl-N,N-dimethylaminoacetate betaine, N,2-acrylamidoethyl-N,N-dimethyl-α-aminopropionate betaine, N,2-acrylamidoethyl-N,N-diethylaminoacetate betaine, N,3-acrylamidopropyl-N,N-dimethylaminoacetate betaine, N,3-acrylamidopropyl-N,N-dimethyl-α-aminopropionate betaine, and N,3-acrylamidopropyl-N,N-diethylaminoacetate betaine.

In place of the polymerization initiator used in the foregoing examples, one may substitute one or more other initiators. Among the suitable ones are: benzoyl peroxide, tertiary butyl peroxide, tertiary butyl hydroperoxide, acetyl peroxide, cumene hydroperoxide, hydrogen peroxide, sodium peroxide, sodium perborate, and sodium persulfate; ammonium persulfate-sodium bisulfite, hydrogen peroxide-thiourea; and potassium persulfate-ferrous sulfate; and α,α'-azobis(isobutyronitrile), α,α'-azobis(α,γ-dimethylvaleronitrile), α,α'-azobis(α,γ,γ-trimethylvaleronitrile), and α,α'-azobis(α-methylbutyronitrile).

The novel copolymers of this invention are very useful for making dispersions of very small particle size. They are very useful in the preparation of photographic emulsions, especially silver halide emulsions. The copolymers also have good protective colloid properties, and can be used for admixture with photographic emulsions prior to coating. They blend well with aqueous gelatin and also are compatible with aqueous and water-ethanol solutions of polyvinyl acetals, including color-forming acetals of the type disclosed in McQueen U. S. Patent 2,310,943.

In addition to being satisfactory substitutes for gelatin in the preparation of aqueous gelatino-silver halide emulsions, they are useful for making filter, anti-halation, anti-static and anti-abrasion layers of photographic elements. In such instances, they may be admixed with suitable dyes, pigments, anti-static agents, etc. The copolymers can be used as the sole water-permeable colloid of such layers or can be admixed with gelatin, polyvinyl acetals and other natural and synthetic colloids in the coating compositions used for such purposes. The copolymers are useful in backing layers for photographic films, in separator layers in photographic films and papers, and as stripping layers in such elements.

In addition to photographic uses the copolymers are useful as sizing agents for paper and textile materials, and as binding agents in dye pastes and in adhesive compositions.

An advantage of the invention resides in the fact that it provides a new class of copolymers which can be used in place of gelatin as peptizing and dispersing agents. The copolymers permit the preparation of silver halide emulsions of high speed that are useful as negative film and X-ray emulsions. Emulsion speeds several hundred times that of photographic printing paper emulsions can be attained with such colloids. A further advantage resides in the fact that by varying the proportions of the components one can obtain copolymers with various desired properties. This cannot be done with gelatin which is a natural product and must be used as obtained, or at best modified by very restricted chemical treatments.

The embodiments of the invention in which an exclusive property or privilege is claimed are defined as follows:

1. A copolymer containing recurring intralinear units of the formulae:

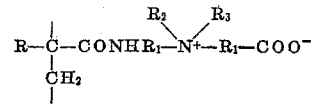

and

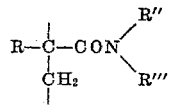

wherein R, R'' and R''' are members taken from the group consisting of hydrogen, alkyl radicals of 1 to 3 carbon atoms, phenyl and cyclohexyl, $R_1$ is a saturated bivalent aliphatic hydrocarbon radical of 2 to 6 carbon atoms, $R_1$ and $R_2$ are hydrocarbon radicals of 1 to 3 carbon atoms and R' is a saturated hydrocarbon radical of 1 to 4 carbon atoms, said first unit constituting 5 to 80 mol percent of the copolymer.

2. A poly(N,2-methacrylamidoethyl-N,N - dimethyl-β-aminopropionate betaine co methacrylamide) said betaine component constituting 5 to 80 mole percent of the copolymer.

3. A poly(N,3-methacrylamidopropyl-N,N-dimethyl-β-aminopropionate betaine co methacrylamide) said betaine component constituting 5 to 80 mole percent of the copolymer.

4. A poly(N,2 - methacrylamidoethyl - N,N - dimethyl-aminoacetate betaine co methacrylamide) said betaine component constituting 5 to 80 mole percent of the copolymer.

5. A poly(N,3 - methacrylamidopropyl-N,N-dimethyl-aminoacetate betaine co methacrylamide) said betaine component constituting 5 to 80 mole percent of the copolymer.

6. A poly(N,3-methacrylamidopropyl-N,N-dimethyl-α-aminopropionate betaine co methacrylamide) said betaine component constituting 5 to 80 mole percent of the copolymer.

7. The process which comprises copolymerizing at a temperature above 20° C., a mixture of 5 to 80 mole percent of at least one compound of the formula:

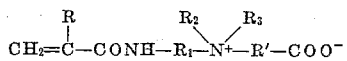

wherein R is a member taken from the group consisting of hydrogen, alkyl of 1 to 3 carbon atoms, phenyl and cyclohexyl, $R_1$ is a saturated bivalent aliphatic hydrocarbon radical of 2 to 6 carbon atoms, $R_2$ and $R_3$ are alkyl radicals of 1 to 3 carbon atoms and R' is a saturated bivalent hydrocarbon radical of 1 to 4 carbon atoms, with 95 to 20 mole percent of at least one compound of the formula:

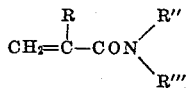

wherein R, R" and R'" are members taken from the group consisting of hydrogen, alkyl of 1 to 3 carbon atoms, phenyl, and cyclohexyl.

8. The process which comprises copolymerizing at a temperature from 40° C. to 70° C., a mixture of 5 to 80 mole percent of at least one compound of the formula:

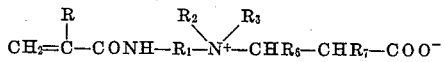

in which R is a member taken from the group consisting of hydrogen, alkyl of 1 to 3 carbon atoms, phenyl and cyclohexyl, $R_1$ is a saturated bivalent aliphatic hydrocarbon radical of 2 to 6 carbon atoms, $R_2$ and $R_3$ are alkyl radicals of 1 to 3 carbon atoms, and $R_6$ and $R_7$ are members taken from the group consisting of hydrogen, methyl and 95 to 20 mole percent of ethyl, and at least one compound of the formula:

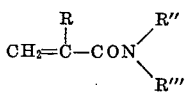

wherein R, R" and R'" are members taken from the group consisting of hydrogen, alkyl of 1 to 3 carbon atoms, phenyl, and cyclohexyl.

9. The process which comprises copolymerizing at a temperature above 20° C. a mixture of at least one compound selected from compounds of the formulae:

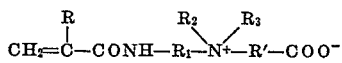
and
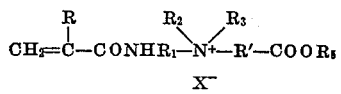

where R is a member taken from the group consisting of hydrogen, alkyl of 1 to 3 carbon atoms, phenyl and cyclohexyl, $R_1$ is a saturated bivalent aliphatic hydrocarbon radical of 2 to 6 carbon atoms, $R_2$ and $R_3$ are alkyl radicals of 1 to 3 carbon atoms, R' is a saturated bivalent hydrocarbon radical to 1 to 4 carbon atoms, $R_5$ is an alkyl radical of 1 to 4 carbon atoms and X is an anion, with at least one compound of the formula:

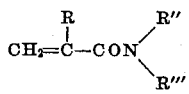

wherein R, R" and R'" are members from the group consisting of hydrogen, alkyl of 1 to 3 carbon atoms, phenyl and cyclohexyl.

10. The process which comprises copolymerizing, at a temperature from 40° C. to 70° C., a mixture of 5 to 80 mole percent of at least one compound of the formula

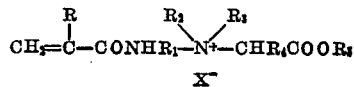

in which R is a member taken from the group consisting of hydrogen, alkyl of 1 to 3 carbon atoms, phenyl and cyclohexyl, $R_1$ is a saturated bivalent aliphatic hydrocarbon radical of 2 to 6 carbon atoms, $R_2$ and $R_3$ are alkyl radicals of 1 to 3 carbon atoms, $R_4$ is a member taken from the group consisting of hydrogen and alkyl radicals of 1 to 3 carbon atoms and $R_5$ is an alkyl radical of 1 to 4 carbon atoms, X is an anion, and 95 to 20 mol percent of at least one compound of the formula:

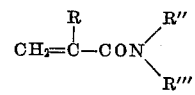

wherein R, R" and R'" are members taken from the group consisting of hydrogen, alkyl of 1 to 3 carbon atoms, phenyl, and cyclohexyl, and hydrolyzing the ester group $COOR_5$ in the resulting copolymer at pH 10 to 11 in an aqueous solution of a base.

11. The process which comprises hydrolyzing, at pH 10 to 11 in an aqueous solution of a base, the ester group in at least one compound of the formula

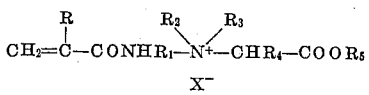

in which R is a member taken from the group consisting of hydrogen, alkyl of 1 to 3 carbon atoms, phenyl and cyclohexyl, $R_1$ is a saturated bivalent aliphatic hydrocarbon radical of 2 to 6 carbon atoms, $R_2$ and $R_3$ are alkyl radicals of 1 to 3 carbon atoms, $R_4$ is a member taken from the group consisting of hydrogen and alkyl radicals of 1 to 3 carbon atoms and $R_5$ is an alkyl radical of 1 to 4 carbon atoms, X is an anion, and copolymerizing from 5 to 80 mole percent of the hydrolyzed monomer with from 95 to 20 mole percent of at least one compound of the formula:

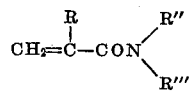

wherein R, R" and R'" are members taken from the group consisting of hydrogen, alkyl of 1 to 3 carbon atoms, phenyl and cyclohexyl.

References Cited in the file of this patent

UNITED STATES PATENTS

| | | |
|---|---|---|
| 2,311,548 | Jacobson | Feb. 16, 1943 |
| 2,396,275 | Kirby | Mar. 12, 1946 |
| 2,567,836 | Anthes | Sept. 11, 1951 |
| 2,649,438 | Bruson | Aug. 18, 1953 |

OTHER REFERENCES

Report on Journal of Polymer Science, vol. 8, No. 3, 1952, pp. 257 and 277.

Chemical Abstracts, vol. 39, No. 24, pp. 5918–5919.